United States Patent
Dole (10) Patent No.: US 8,273,156 B2
(45) Date of Patent: Sep. 25, 2012

(54) METHOD AND APPARATUS FOR WATER DISTILLATION AND RECOVERY

(76) Inventor: Eric John Dole, Goodyear, AZ (US)

(*) Notice: Subject to any disclaimer, the term of this patent is extended or adjusted under 35 U.S.C. 154(b) by 637 days.

(21) Appl. No.: 12/496,411

(22) Filed: Jul. 1, 2009

(65) Prior Publication Data

US 2010/0000851 A1      Jan. 7, 2010

Related U.S. Application Data

(60) Provisional application No. 61/133,611, filed on Jul. 1, 2008.

(51) Int. Cl.
*B01D 19/00* (2006.01)

(52) U.S. Cl. ............... 95/247; 95/250; 95/257; 203/11; 203/12

(58) Field of Classification Search .............. 95/247, 95/250, 256, 257; 203/11, 12
See application file for complete search history.

(56) References Cited

U.S. PATENT DOCUMENTS

| | | | |
|---|---|---|---|
| 3,248,305 A * | 4/1966 | Williamson | 202/180 |
| 3,948,734 A | 4/1976 | Kohl et al. | |
| 5,049,045 A | 9/1991 | Oklejas et al. | |
| 5,205,906 A | 4/1993 | Grutsch et al. | |
| 6,139,740 A | 10/2000 | Oklejas | |
| 6,454,907 B1 | 9/2002 | Erdman | |
| 6,797,173 B1 | 9/2004 | Oklejas, Jr. | |
| 6,862,886 B2 | 3/2005 | Stewart | |

* cited by examiner

*Primary Examiner* — Robert A Hopkins
(74) *Attorney, Agent, or Firm* — Etherton Law Group, LLC; Benjamin D. Tietgen; Sandra L. Etherton (57) ABSTRACT

Contaminated water stored in an equalization basin is distributed to one or more flash vessels and a desired vacuum is pulled in a filled flash vessel, reducing the boiling point of the contained contaminated water. The suction force is preferably created by passing the contaminated water under pressure through a differential pressure injector. The contaminated water in the flash vessel completes an electrical circuit between conductive plates and a heating element that are submerged therein. An alternating electrical current is applied, some of which is conducted by the contaminated water to a heating element that heats the water, and the rest of which dissipates as thermal energy, heating the contaminated water. The alternating current is preferably generated by passing the contaminated water under pressure through a hydroelectric power generator. Little thermal energy is needed to evaporate the contaminated water, which condenses at the top of the flash vessel and is collected from a collection trough. Slurry created by distillation is delivered to the equalization basin to increase the conductivity and temperature of the stored contaminated water.

16 Claims, 2 Drawing Sheets

METHOD AND APPARATUS FOR WATER DISTILLATION AND RECOVERY

CROSS-REFERENCE TO RELATED APPLICATIONS

This application is a non-provisional application of and claims the benefit of U.S. Provisional Patent Application Ser. No. 61/133,611, filed Jul. 1, 2008, which is incorporated herein by reference.

FIELD OF INVENTION

This invention relates to distilling water. This invention relates particularly to a method and apparatus for distilling and recovering clean water from contaminated water.

BACKGROUND

There are many technologies on the market used to treat contaminated water for re-introduction into rivers and lakes, irrigation, or human consumption. Each technology has its benefits and downfalls depending on raw water quality, footprint, energy cost, capital cost, end user of the recovered water, and ease of operation. For example, seawater, brackish water, and fresh water have different levels of salinity, which is often expressed by the total dissolved solids (TDS) concentration. Seawater has a TDS concentration of about 35,000 mg/L, and brackish water has a TDS concentration of 1000 to 10,000 mg/L. Another problematic water source requiring treatment is salt brine used to regenerate cationic ion exchange resin, which is typically used for water softening. Such brine has TDS concentrations ranging from 100,000 mg/L, or higher. It is advantageous to recover fresh water from these sources. Water is considered fresh when its TDS concentration is below 500 mg/L, which is the National Secondary Drinking Water standard for the United States.

The two most commonly known technologies for desalinating seawater and other challenging water sources are multi-stage flash ("MSF") systems and reverse osmosis ("RO") systems. Both are very energy intensive, and expensive to design, build and operate. MSF systems typically include a large distiller installed next to a power plant, whereby the seawater is used to cool reactors and is heated as a consequence. The latent heat from the power plant drives the distillation process, causing the water to change phase from liquid to gas and then back to liquid through condensation on a cooler surface. The condensed, or distilled, water is almost completely free of contaminants, predominantly salt in the case of seawater. A MSF system can remove up to 99% of the TDS in seawater. The removal efficiency is dependent on the temperature of the incoming seawater and the efficiency of the distilled water collection process. MSF utilizes multiple effect distillation, vapor compression, or both, to help improve how efficiently it can boil, condense and recover the water.

While MSF desalination can achieve high levels of water purity, there are several drawbacks with known implementations. MSF systems incur high capital and construction costs due to exotic material needed for the complex flash chambers and control of corrosion caused by high temperature scaling agents. Operating such systems requires a series of complex processes that require sophisticated controls. The process becomes uneconomical if a free heat source for the incoming raw water, such as cooling water from a power plant, is not available. Finally, a large land area is required per gallon of treated water due to the size of equipment and tankage. A water recovery system that achieves the high purification efficiency of MSF systems without the drawbacks is needed.

RO systems may be used for many water treatment applications, including desalination. RO systems do not require heating of the input water and have a smaller geographical footprint than MSF systems. All RO desalination processes involve three liquid streams: raw input water, low-salinity permeate, and high-salinity concentrate. Most contaminants in the feedwater are removed by forcing the feedwater through a semi-permeable RO membrane with the use of high pressure pumps. Depending on the type of membrane, the feedwater quality, and use of pre-treatment chemicals, the water pressure imparted on the membrane ranges between 250 psi and 1,250 psi for effective removal of TDS. Often, pre-treatment of the feedwater is required before passing through the RO membrane so the membrane does not irreversibly foul, thereby significantly decreasing the removal efficiency of the TDS and increasing operational costs. At its most efficient, RO can achieve 98% TDS reduction for brackish water applications and 75% for seawater applications. While a higher TDS reduction may be accomplished using advanced RO system design, such as cascaded membranes and pre- and post-treatment methods, these augmented designs intensify the drawbacks described below.

There are several drawbacks associated with RO desalination. RO systems require high capital and construction costs due to materials such as membranes, piping, and materials needed to prevent scaling and fouling of the RO membrane. Like MSF systems, RO systems require sophisticated controls to manage multiple processes. Both pre- and post-treatment of the input and output streams is required to achieve optimal efficiency. There is a very high operational cost per gallon of treated water due to the high pressure feed pumps needed to "push" the water through membrane. A less complex, less expensive recovery system that can achieve high water purities is needed.

There are also disposal issues with the concentrate stream, which can be as much as 35% of the volume of the feedwater depending on the recovery efficiency of the RO membrane. Specifically, the RO concentrate stream has very poor water quality due to the combination of feedwater contaminants and pre-treatment chemicals present therein. The typical annual volume of concentrate generated from a 3.5 million gallons-per-day ("Mgd") inland RO facility used to treat groundwater can range between 84.1 million and 168 million gallons depending on recovery efficiency and demand. This is a very large volume of water with very poor water quality. The concentrate is typically sent to solar drying beds, deep wells, ocean outfalls, or, more often, wastewater treatment plants via the sewer collection system. Unfortunately, there are significant limitations with known means of concentrate disposal. Solar drying beds are very costly due to a large footprint requirement, lack of water recovery, and restricted use only to arid climates. Deep wells and ocean outfalls are falling out of favor due to the adverse ecological and environmental impact. Ocean outfall disposal is becoming more regulated as the density of the concentrate is denser than the ambient seawater. This allows the concentrate to sink to the bottom of the ocean, thereby killing various forms of seagrass and subsequent aquatic life. Conventional wastewater treatment facilities cannot remove the high TDS content in the concentrate without the use of sophisticated tertiary treatment that is uneconomical to design, build, and operate. A large amount of the TDS content ultimately gets passed through the plant to the end user. Because RO systems are frequently used in water treatment facilities, a method and apparatus for treating RO concentrate that removes TDS content as well as other contaminants is needed.

Therefore, it is an object of this invention to provide a method and apparatus to recover clean water from a heavily contaminated input stream, regardless of the contaminants contained therein. It is a further object to utilize multiple effect vacuum distillation to treat the input stream. It is another object that the apparatus be implemented as either a stand-alone system or a component of an existing water treatment facility. It is a further object that the apparatus generates some or all of its own operating power. It is a further object of this invention to destroy organic contaminants that may not be removed by known processes. Another object of the invention is to provide a water recovery apparatus that has low capital and maintenance costs, a small footprint, and reduced ecological impact.

SUMMARY OF THE INVENTION

This apparatus recovers clean water from contaminated water using multiple-effect vacuum distillation and heating technology to evaporate, condense, and collect the clean water at lower operating temperatures than conventional thermal distillation. The apparatus and its methods of operation can be implemented as a complement to a membrane filter water treatment process, such as RO filtration, or as a stand-alone system.

Contaminated water is contained in an equalization basin and distributed by pump or gravity to one or more electrically non-conductive flash vessels to a predetermined maximum volume. The internal pressure of the sealed flash vessel is reduced by passing a high-pressure stream through a Venturi-type differential pressure injector that "pulls" a vacuum in the flash vessel until the water's boiling point has been lowered to preferably about 76 degrees Fahrenheit. The contaminated water is then made to function as an electrolytic solution by passing an alternating current through it. Preferably, the alternating current passes between two conductive plates on opposite sides of the flash vessel, completing an electrical circuit between the current source and a circuit load. One or more heat sources, preferably an electrical heating element, may be connected to one of the plates to provide the circuit load. The heat source is positioned within the flash vessel to further heat the contaminated water.

The temperature of the incoming contaminated water determines how quickly it reaches its depressed boiling point and evaporates. The evaporated water condenses, as distilled water, at the top of the flash vessel and falls into a distilled water collection trough. As the water evaporates, the internal pressure of the flash vessel increases, thereby decreasing the rate of evaporation. To counteract this effect, the contaminated water may be continuously heated, or the vacuum pressure within the flash vessel may be continuously increased until a desired volume of distilled water is collected. The distilled water flows by gravity or is pumped into a clearwell for later distribution and human consumption. The contaminated water is reduced to slurry and removed by pump or gravity and transported to a drying bed, or reintroduced into the equalization basin to increase the conductivity of the contaminated water.

The apparatus may be integrated as a component in a water treatment facility, where the contaminated water is supplied by a concentrate stream from a membrane filter such as a RO membrane. The concentrate stream passes through a hydroelectric power generator, such as a micro-turbine, which generates the electric current for heating the water and may power other elements in the apparatus, such as pumps and controllers. The apparatus may also be connected to the local power grid or another power source to satisfy the apparatus's electrical loads. The concentrate stream also passes through a Venturi-type differential pressure injector that is connected to the flash vessel and pulls the vacuum in the flash vessel. A small portion of the concentrate stream is directed into a heat sink bath surrounding the flash vessel. The heat sink bath cools the surfaces on which the evaporated water condenses, hastening condensation. The water in the heat sink bath is heated during the condensation process, and may be cooled by passage through a heat exchanger or water chiller before entering the heat sink bath. All portions of the concentrate stream then pass into the equalization basin, where the contaminated water is stored and heated, until one or more flash tanks are ready to be filled. The stored contaminated water may be heated passively, such as by solar heating, or actively, such as with a heating element.

As a stand-alone water recovery system, the method of water recovery proceeds as in the component system. If a stream of contaminated water can be provided under pressure, the stand-alone system will generate a vacuum and power as above. If not, the stand-alone system may include one or more vacuum pumps to increase the vacuum pressure in the flash vessels. The apparatus may be connected to the local power grid or another power source to provide the electric current for heating the water and for powering the pumps and controllers. In either the component or stand-alone embodiment, the apparatus may be scaled up or down, according to the amount of concentrate produced by the facility, by changing the size of the flash tanks or adding or subtracting flash tanks.

DETAILED DESCRIPTION OF THE INVENTION

The present methods and apparatuses separate contaminated water into distilled water and slurry. The distilled water contains substantially no TDS, sodium, fluoride, nitrate, arsenic, calcium, hardness, iron, manganese, and lead, and further contains no endocrine disrupters, viruses, or other pathogens, and is suitable for human consumption. The slurry contains these and any other contaminants that were present in the contaminated water. The distilled water is collected as described below, while the slurry is removed by pump or gravity and transported to a drying bed or reintroduced into an equalization ("EQ") basin to increase the conductivity and temperature of the contaminated water. The invention may be implemented in a component embodiment or a stand-alone embodiment. The apparatus may be scaled up or down depending on the amount of input contaminated water and output distilled water desired.

Figure 1:
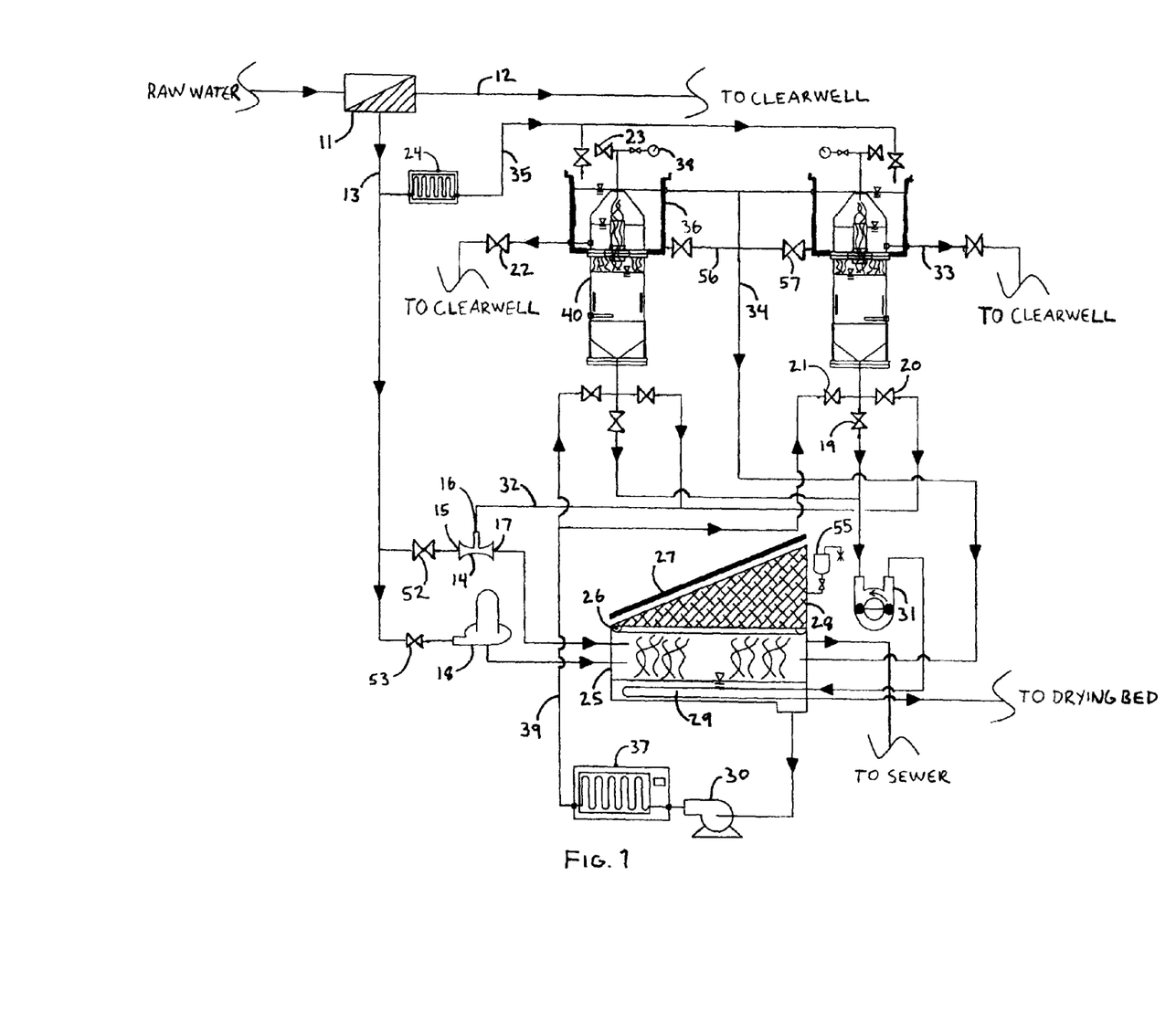
FIG. 1 is a schematic of the present invention implemented as a component of a water treatment facility.
Figure 2:
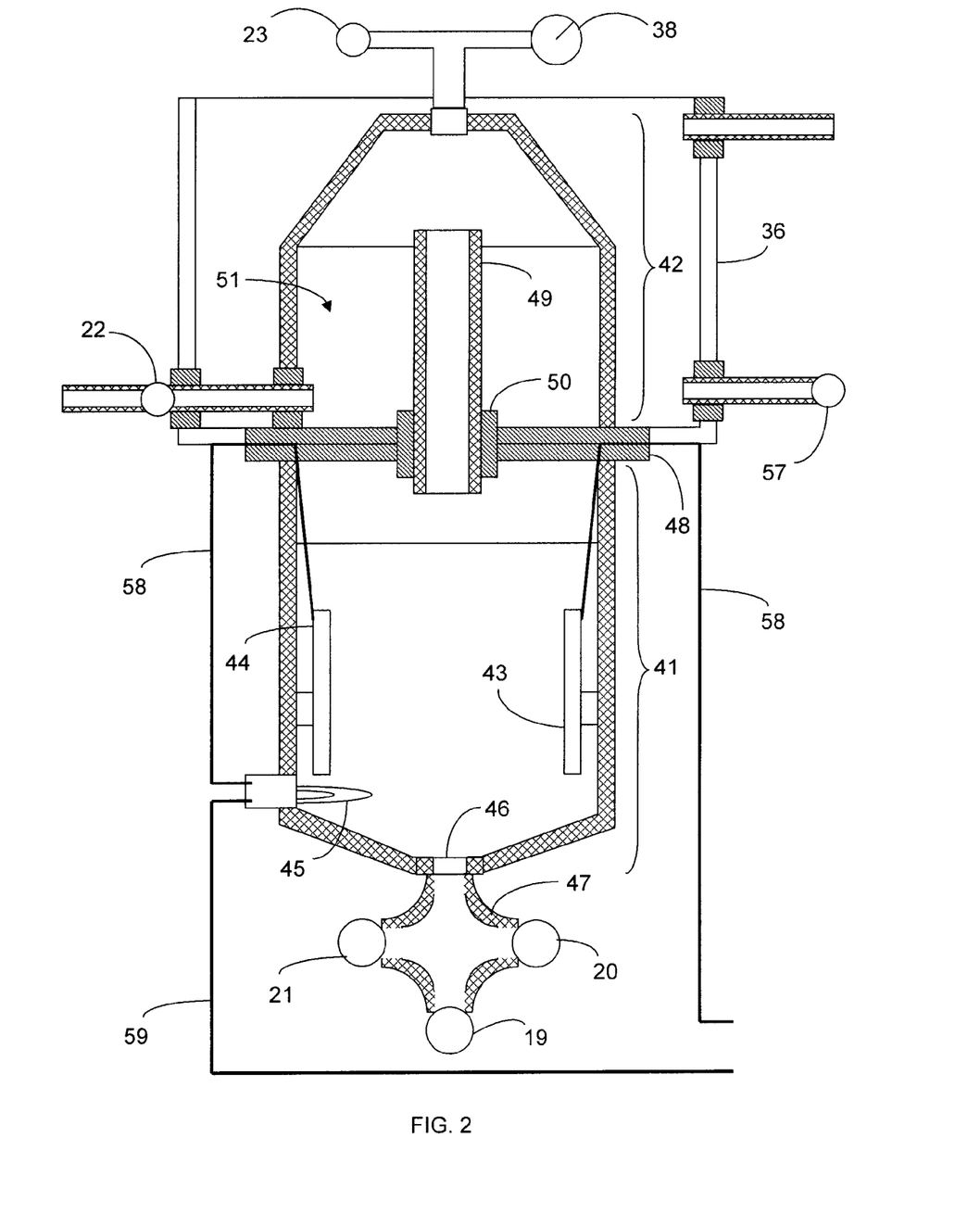
FIG. 2 is a cross-sectional front view of a flash vessel of the present invention.

Referring to FIGS. 1 and 2, a component embodiment of the apparatus is designed to generate distilled water from a high pressure raw water or concentrate stream, such as one generated by RO filtration. The processes described below are automated and controlled by a programmable logic controller ("PLC") and multiple sensors and isolation valves. During RO filtration, an RO filter 11 generates a high pressure concentrate stream 13 that contains the removed contaminants and low pressure permeate stream 12 that comprises clean water. The pressure of the concentrate stream 13 is determined by the feedwater pressure, feedwater quality, the type of RO filter, and the subsequent recovery rate. For example, an inland RO treatment facility used to remove TDS, nitrate, fluoride and arsenic that processes 1 Mgd and exhibits an 80% recovery rate with the use of antiscalants as pre-treatment generates a concentrate stream having a pressure of 120 psi and flow of 80 to 120 gallons per minute ("gpm").

In this embodiment, the concentrate stream 13 may be used to perform three processes, either serially or in parallel: pull a vacuum in a flash vessel 40 that is filled to a preset level with contaminated water; generate power by passing through a hydroelectric power generator 18; and fill a heat sink bath, in a whirlpool manner, that improves the distillation efficiency inside the flash vessel 40. As described below, the constituent parts of the concentrate stream 13 are emptied into the EQ basin 25 after some or all of these processes are complete.

The flash vessel 40 is made of a rigid material that is not electrically conductive and is capable of containing the desired vacuum pressure, such as cement or a hardened polymer, such as polyvinyl chloride ("PVC") or chlorinated PVC ("CPVC"). In the preferred embodiment, the flash vessel 40 is made of schedule 80 PVC. The flash vessel 40 preferably has a flow port 46 allowing access to the flash vessel 40 through the bottom. The flow through the flow port 46 is managed by the PLC, which directs the opening and closing of a vessel fill valve 21, vacuum valve 20, and slurry valve 19 connected to a flow bulkhead 47 connected to the flow port 46. The flow bulkhead 47 is preferably a 4-way CPVC pipe cross-fitting which contacts and creates a watertight and airtight seal around the flow port 46. The valves 21, 20, 19 are preferably quarter turn valves, and more preferably TYP3 CPVC ball valves that are electrically non-conductive. When one valve is open, the others are closed. The valves may have limit switches to indicate position, so as to effectively manage the various processes through the PLC.

Fill Process

Contaminated water is delivered from the EQ basin 25 through a fill line 39 comprising non-conductive pipes or troughs to one or more flash vessels 40. The contaminated water may flow into the flash vessels 40 by gravity or may be pumped by a fill pump 30. Because rapid evaporation during the distillation process is desired, the contaminated water may be heated as much as possible, using methods described below, before it fills a flash vessel 40. However, the efficiency of increased temperature is balanced in the system with economy of power usage, as explained in detail below. Therefore, depending on the implementation, the contaminated water may be heated by a water heater 37, preferably an inline heater, before filling the flash vessels 40.

A flash vessel 40 is filled through the fill valve 21 to a desired volume with contaminated water so that the liquid level is below a distilled water collection trough 51 and a variable head space remains above the bottom of the trough 51. In the preferred embodiment, the flash vessel 40 has a flash chamber 41 and a condensing chamber 42, both cylindrical, having equal diameter, and being separated by one or more chamber flanges 48. The chamber flanges 48 may be made of non-conductive material such as PVC, with the exception of the metal bolts, nuts and washers used to secure the flanges. The chamber flanges 48 may serve as thermal insulators between the flash chamber 41 and condensing chamber 42. Elastomeric gaskets (not shown) may be placed between the chamber flanges 48 to assist in the airtight seal between the flash chamber 41 and the condensing chamber 42.

The flash chamber 41 contains the contaminated water and is connected to the condensation chamber 42 by way of an internal vent 49, described below. Air within the flash vessel 40 is displaced through an air valve 23 that is open during filling and emptying. A non-conductive, electrically isolated fill level sensor (not shown) inside the flash vessel 40 detects that the desired volume of contaminated water has been reached and alerts the PLC. The level sensor may be a continuous level sensor with an output of 4 to 20 mA, a simple discrete level switch based on water contact completing a circuit at the desired level, or a flow totalizer used on the influent line. The level sensor may be insulated against electrical shorting when the concentrate water is conducting an electrical current during the distillation process explained below. Once the flash vessel 40 is filled with concentrate, the PLC seals the flash vessel 40 by closing the air valve 23, slurry drain valve 19, vessel fill valve 21 and distilled water drain valve 22, each of which are capable of maintaining a complete seal under the desired vacuum condition so as to prevent air entry. The PLC then initiates the vacuum process. In a facility utilizing multiple flash vessels 40, the PLC may further direct the filling of the next-empty flash vessel 40.

Vacuum Process

In order to pull a vacuum, some, or all, of the concentrate stream 13 is directed through an injector valve 52 into a differential pressure injector 14 at the injector inlet port 15. Preferably, the injector valve 52 is connected in parallel with a generator valve 53, as shown in FIG. 1, and the majority of the concentrate stream 13, less a small portion directed to the heat sink baths 36, is passed through the open injector valve 52 while the generator valve 53 remains closed. The injector 14 is a Venturi-type differential pressure injector, such as an appropriately-sized Mazzei® or Pentair® injector, that generates a pressure difference between the injector inlet port 15 and the injector outlet port 17 when a pressurized liquid is passed through it. The pressure difference creates suction at the injector vacuum port 16. The injector vacuum port 16 is connected by a vacuum line 32, capable of maintaining a complete seal under the desired vacuum condition so as to prevent air entry, to a bulkhead in each flash vessel 40 through a vacuum valve 20. To pull the vacuum, the PLC opens the vacuum valve 20 and injector valve 52, while the air valve 23, vessel fill valve 21, distilled water drain valve 22, and slurry drain valve 19 remain closed. The closed valves seal the flash vessel 40, allowing the suction from the injector 14 to create an internal vacuum in the flash vessel 40. The preferred vacuum pressure, measured as an amount subtracted from a standard atmospheric pressure of 29.92 inches Hg, is between about 15 and about 29 inches Hg. Most preferably, about 29 inches Hg is pulled from the flash vessel 40, which will allow the contaminated water contained in the flash vessel 40 to boil at about 76 degrees Fahrenheit. The rigid structure of the flash vessel 40 and the airtight seal of the valves, chamber flanges 48, and gaskets cause the flash vessel 40 to go under a vacuum condition almost instantly.

In the preferred embodiment, the PLC will continuously pull the vacuum in the flash vessel 40 during the evaporation process. To continuously pull the vacuum, the vacuum line 32 is connected to flash vessel 40 below the liquid level, and most preferably at the bottom of the flash vessel 40, so that the vacuum does not evacuate the evaporated water from either chamber 41, 42 of the flash vessel 40 before it is allowed to condense and be collected as distilled water. In alternate embodiments, the vacuum may be pulled only once, before the evaporation process begins. In such an embodiment, the vacuum line may be connected above the maximum liquid level inside the flash vessel 40.

In the preferred embodiment, the discharge stream from the injector 14 flows to the EQ basin 25 where it is stored for later treatment in the flash vessel 40. Alternatively, the discharge stream from the injector 14 may flow into one or more heat sink baths 36, or into a hydroelectric power generator 18 to power the system as described below. A pressure gauge 38 and transmitter may indicate to the PLC when the process has reached the desired vacuum pressure, so that the PLC may initiate the next steps in the process. Typically, the next step will be heating the contaminated water contained in the flash vessel 40 to stimulate phase change of the water. In a facility utilizing multiple flash vessels 40, the PLC may further direct a vacuum to be pulled in the next-filled flash vessel 40, and may also direct filling of the next-empty flash vessel 40, as described in detail below.

Electricity Generation Process

In the preferred embodiment, the apparatus is capable of generating electrical power to satisfy a portion of the internal electrical loads, namely the AC circuit and heating element 45 discussed below, PLC, level sensors, slurry pump 31, fill pump 30, water heater 37, cooling device 24, and any necessary monitoring equipment. To generate power, some, or all, of the concentrate stream 13 is delivered under pressure to a hydroelectric power generator 18. The generator 18 is preferably a micro-turbine of either the impulse or reaction type, depending on the system implementation. Preferably, the entire concentrate stream 13 is passed through the generator 18 in an effort to generate the most amount of electricity. For example, the preferred micro-turbine is capable of operating at up to 90 percent efficiency when the concentrate stream 13 is moving 60 gpm at a pressure of 120 psi, continuously generating about 3 kW of electricity so long as water is moving through the turbine.

Any electricity generated beyond the needs of the apparatus may be sent to other electrical loads in the water treatment facility or to grid storage. If insufficient electricity is generated to operate the apparatus, the generator 18 may be augmented by connection to the grid power supply or by solar power provided by solar panels 27 oriented atop the EQ basin 25. If solar power is utilized, the EQ basin 25 is preferably oriented in a direction that promotes the most efficient solar energy collection. After passing through the generator 18, the concentrate stream 13 is delivered to the heat sink bath 36 or the EQ basin 25.

Flash Vessel Distillation Process

Under a vacuum of 29 inches Hg, the contaminated water in the flash vessel 40 will have a boiling point of about 76 degrees Fahrenheit. If the contaminated water temperature is about 76 degrees Fahrenheit or higher, a portion of the contaminated water will flash into evaporated water as quickly as the vacuum is pulled. The hotter the contaminated water, the quicker it will evaporate. The evaporating water will cause the internal pressure of the flash vessel 40 to increase, requiring either a repeated or continuous vacuum process or an increase in water temperature to continuously and efficiently distill the contaminated water to the desired extent. The PLC may repeat the vacuum process by opening and closing the appropriate valves, either at preset intervals or by signal from the pressure gauge 38 and transmitter that a new vacuum is needed. The vacuum is pulled from beneath the liquid level in the flash vessel 40, preferably from the bottom of the flash vessel 40, so that none of the evaporated or distilled water is pulled out of the flash vessel 40. It is preferred, however, that the vacuum be continuously pulled to minimize wear on the valves from repeated actuation.

Once the desired vacuum has been pulled, an alternating electrical current ("AC") is applied to the contaminated water, which due to its conductivity will complete the AC circuit described below. Alternating current, rather than direct current, prevents or inhibits the formation of hydrogen and chlorine gas due to electrolysis. At least two electrically conductive plates 43 and 44 are positioned within the flash vessel 40 on opposite sides of it, and are at least partially submerged in the contaminated water. The plates 43 and 44 are preferably made of the same electrically conductive material, which may be conductive graphite, conductive plastic, or a metal that does not degrade significantly during the process, such as aluminum or high grade stainless steel, so as not to add impurities to the contaminated water. The material is most preferably aluminum due to its low cost and availability. The plates 43 and 44 may be attached to the inner surface of the flash vessel 40 by adhesive or non-adhesive means, or they may be free standing. In the preferred embodiment, the "hot" leg 58 of the AC circuit is broken and attached to the plates 43 and 44 on each side of the vessel 40 by routing an appropriately sized electrical conduit between the chamber flanges 48 without breaking the airtight seal. The "neutral" leg 59 of the AC circuit remains continuous, and is routed on the outside of the flashing vessel 40 from a power source to a circuit load, preferably a heating element 45 as explained below, that completes the circuit. The "hot" and "neutral" legs 58, 59 are attached to the proper respective terminals of the circuit load.

The contaminated water, having a higher-than-normal conductivity due to its impurities, completes the AC circuit and conveys the AC between the conductive plates 43 and 44. The contaminated water also has a resistance that depends on the amount and type of contaminants. The resistance causes some of the electrical energy to be converted and radiated as thermal energy that heats the contaminated water. A heavily tainted, highly conductive contaminated water supply will retain more of the AC in the circuit, and a less conductive, more resistant supply will result in heating of the contaminated water through its inherent resistance. Further, the AC in the contaminated water may neutralize or kill any organic matter, such as pathogens, viruses, bacteria, endocrine disrupters, and pharmaceutical byproducts that may be present.

The heating element 45 may be a conventional water heating element that is rated at sufficient wattage to sustain the current through the contaminated water and heat the contaminated volume of water to the desired temperature. The heating element 45 may be made of a material that will withstand corrosion in the contaminated water. The choice of material will therefore depend on the expected impurities. For example, acceptable materials for a seawater application include ceramic and salt-resistant metal such as aluminum. Powering the heating element 45 contributes to heating the contaminated water until it reaches its depressed boiling point, and may further heat the remaining contaminated water to compensate for the increasing pressure inside the flash vessel 40 as water evaporates.

The evaporated water rises through an internal vent 49 to the top of the flash vessel 40, condenses on the cooler inner surface, and falls into the distilled water collection trough 51. In the preferred embodiment, the internal vent 49 is a non-conductive standpipe with the chambers 41 and 42 and having a length and diameter determined by the volume of contaminated water to be treated. Specifically, the length of the standpipe should correspond to the maximum fill level of the distilled water collection trough 51. The internal vent 49 is tapped through the chamber flanges 48 and extends substantially into the condensing chamber 42, but only slightly into the flash chamber 41 so as not to contact the contaminated water when the flash vessel 40 is at its maximum fill level. The internal vent 49 is preferably the same material as the flash vessel 40 and is attached to the chamber flanges 48 by a watertight chamber bulkhead fitting 50 of the appropriate size. Preferably, the standpipe is installed in the center of the flashing vessel 40 by core drilling an appropriately sized hole through the bottom of the heat sink bath 36, flash chamber 41, and condensing chamber 42. A 2-way bulkhead fitting is used to maintain the seal between the chambers 41, 42. Preferably, the space within the condensing chamber 42 below the opening of the standpipe forms the collection trough 51. The annular volume of the collection trough 51 may be sized to allow the entire volume of contaminated water in the flash chamber 41 to be stored, in anticipation of 100% recovery of the water.

The internal surface at the top of the flash vessel 40 may be rounded or inclined to promote condensation and drainage into the collection trough 51. Preferably, the top of the flash vessel 40 is cone-shaped. Radiator-like fins (not shown) may be positioned at or near the top of the flash vessel 40 to increase the condensation surface area. A distilled water drain valve 22 remains closed until sufficient distilled water has accumulated in the collection trough 51, at which time it opens in conjunction with the air valve 23 and allows the distilled water to drain by gravity or pump to a clearwell (not shown). Similar level indication used in the flash chamber 41 may also be used in the distilled water collection trough 51, so as to indicate to the PLC when to initiate the next phase of the treatment process.

As an alternative to the distilled water drain valve 22, a vertical p-trap (not shown) of at least 34 feet in length may be installed exterior to the flash vessel 40. This length of p-trap will prevent the distilled water in the trough 51 from siphoning back into the flash vessel 40 under the vacuum pressure. The p-trap is a more passive way to ensure that the desired vacuum is pulled without having to open and close valves at various steps throughout the distillation process, but may pose more of a construction obstacle than a distilled water drain valve 22. For example, the volume of water in one of the two vertical pipe runs of the p-trap will be "sucked" back into the trough during the process, requiring a larger storage volume in the trough 51.

The condensing chamber 42 may be partially or fully enclosed by a heat sink bath 36 designed to increase the temperature difference between the evaporated water and the surfaces of the flash vessel 40 on which the evaporated water should condense by cooling those surfaces from outside the flash vessel 40. In order to provide more efficient heat transfer, the condensing surfaces of the flash vessel 40 may be made of thermally conductive material, such as aluminum or stainless steel. A portion of the concentrate stream 13, referred to herein as the bath stream 35, is directed under pressure into the heat sink bath 36. The bath stream 35 may come from the generator 18, the injector 14, or directly from the RO filter 11 as shown. The bath stream 35 may also or alternatively comprise a portion of the permeate stream 12. The bath stream 35 may pass through a cooling device 24, such as a heat exchanger or water chiller, so that the water may better cool the surfaces of the condensing chamber 42. The bath stream 35 preferably enters the heat sink bath 36 on a non-radial path, creating a whirlpool effect to stir the water in the heat sink bath 36. The water in the heat sink bath 36 will be heated as it cools the surfaces of the condensing chamber 42. At the desired maximum fill line of the heat sink bath 36, an outlet allows water to flow into the bath overflow 34, which is conveyed to the EQ basin 25. The thermocline of the water in the heat sink bath 36 will promote the hotter water to rise to the surface and flow out of the overflow located at the top, so that the hotter water overflows out of the heat sink bath 36 as cooler water enters. A bath drain line 56 and bath drain valve 57 may be connected to the bottom of the heat sink bath 36 to provide a means to drain the bath for maintenance.

Slurry Removal

The distillation process will leave highly concentrated slurry comprising removed impurities at the bottom of the flash chamber 41. The slurry may be hot due to heating during the distillation process. The slurry may be removed from the flash vessel 40 by opening the slurry valve 19 in the bottom of the flash vessel 40 and the air valve 23 at the top of the flash vessel 40, so that it drains by gravity or is pumped out by a slurry pump 31. Preferably, the slurry pump 31 is a peristaltic pump wherein the wetted parts are composed of or covered with an electrically non-conductive material, such as polyethylene. The flash chamber 41 may be inclined, and is preferably cone-shaped, at the bottom to facilitate draining of the entire quantity of slurry. The draining process continues for either a preset time frame, or until a level transducer signals to the PLC that all the liquid in the flash chamber 41 has been evacuated. The slurry may be sent to an evaporation pond or, preferably, to the EQ basin 25 to increase the conductivity and temperature of the contaminated water therein. When the slurry pump 31 is de-energized, a signal is sent to the PLC that the flash vessel 40 is empty and ready for the next filling process.

Equalization and Ancillary Distillation

All portions of the concentrate stream 13 are delivered to the EQ basin for equalization of the supply before treatment. The EQ basin 25 may be one or more above- or below-ground storage tanks or an in-ground basin which holds contaminated water delivered by the concentrate stream 13 and allows the downstream treatment processes to "catch-up" with the incoming flow when the flow decreases.

The EQ basin 25 may be configured to facilitate distillation of some of the contaminated water before it is distributed to the flash vessels 40. An air-impermeable hood 28 covering the water supply may create an airtight seal, inducing a greenhouse effect to heat the stored contaminated water. The hood 28 may be conical in shape, if covering a cylindrical storage tank, or trapezoidal if covering a rectangular basin. An EQ air valve 55 installed on the hood 28 allows a rise and fall of the water level without affecting the temperature inside the EQ basin 25. Further heating may provided by reintroduction of the hot slurry from the flash vessels 40 and the water from the heat sink baths 36 into the EQ basin 25. A heating dissipating coil 29 may be added in the bottom of the EQ basin 25 to promote additional latent heat recovery from the slurry. The coil 29 is preferably fully submerged in the stored water. A heating element (not shown) may even further heat the water and may be powered by the generator 18 or by another power source. The composition of the contaminated water and the water temperature that can economically be reached will determine how much of the stored water will evaporate in the EQ basin 25.

Phase change efficiency of water stored in the EQ basin 25 may be improved by running cool water, such as a stream of slurry blowdown, concentrate, or RO feedwater, over the external surface of the hood 28, increasing the temperature difference to promote condensation on the interior surfaces. The hood 28 may be inclined to promote collection of condensate at a desired location. An EQ basin collection trough 26 may be positioned between the hood 28 and the top of the EQ basin 25, and span some or all of the perimeter of the EQ basin 25. Condensate will flow by gravity into the collection trough 26 and into a water recovery tank (not shown) where it may combine with the distilled water flow 33 from the flash vessels 40.

Apparatus Design

In a high throughput facility, the concentrate stream 13 will be uninterrupted and the EQ basin 25 will be constantly filling and draining. The EQ basin 25 may have an overflow connection plumbed to the sewer so the concentrate will passively flow by gravity to the sewer, which may be necessary in the event the treatment system is taken out of service for maintenance. The apparatus may be operated as a batch process, wherein the flash vessels 40 perform each process simultaneously, or as a continuous process by sequencing each process to each flash vessel 40. For example, in a three-vessel configuration of a continuous process, the first flash vessel 40 may be filling, a second may be distilling, and a third may be emptying. The process sequencing is managed by the PLC, which tracks the status of each flash vessel 40 by receiving either discrete signals from limit switches on valves or signals from level transducers in the flash vessels 40. In one embodiment, the PLC tracks whether each flash vessel 40 is empty, filling, or distilling. The number of flash vessels 40 needed for optimal operation of the apparatus is determined by the incoming flow's effect on the time it takes to fill a flash vessel 40, pull a vacuum, distill and collect the condensate. For example, if the apparatus has a 75% recovery rate, and it takes 1 minute to fill, pull a vacuum, distill and collect the condensate for 2.25 gallons of concentrate, the capacity of one flash vessel is 2.25 gpm. If a 60 gpm continuous concentrate stream needs to be treated, it will take 27, 2.25-gpm flash vessels 40 to treat the flow. At optimal operation, there are sufficient flash vessels 40 in the apparatus so that the flow to the flash vessels 40 is not interrupted. One or more flash vessels may be removed from the process cycle for cleaning and other maintenance, or if the influx of contaminated water is low enough to render them temporarily unneeded.

In a stand-alone embodiment of the apparatus, implemented at a water treatment facility that cannot supply a high pressure concentrate stream to the apparatus, the apparatus functions as in the component embodiment, except that it does not generate its own power. In this embodiment, the generator 18 is removed and electricity is completely supplied by grid or solar power. The contaminated water may be fed directly from a contaminated water source into the EQ basin 25, and a feed pump may boost the pressure of the concentrate stream 13 so that the vacuum injector 14 may still be used. In this embodiment, the feed pump replaces the RO membrane 11 shown in FIG. 1. If there is no high-pressure concentrate stream, the injector 14 may be replaced with a vacuum pump and the vacuum valve 20 moved to above the maximum fill line, so that the vacuum pump extracts air from the head space to achieve the desired pressure inside the flash vessel 40.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

I claim:

1. A method of distilling contaminated water, the method comprising:
   a. filling a flash vessel with a predetermined volume of contaminated water;
   b. pulling a vacuum in the flash vessel, wherein pulling the vacuum comprises delivering a stream of the contaminated water under pressure to an injector connected to the flash vessel; and
   c. passing an electrical current through the contaminated water in the flash vessel to cause a phase change of the contaminated water into evaporated water;
   wherein the injector is connected to the flash vessel at the bottom of the flash vessel so that the vacuum may be continuously pulled without evacuating evaporated water from the flash vessel.

2. The method of claim 1 wherein the injector is a Venturi-type differential pressure injector.

3. A method of distilling contaminated water, the method comprising:
   a. filling a flash vessel with a predetermined volume of contaminated water;
   b. pulling a vacuum in the flash vessel;
   c. generating an electrical current by delivering the contaminated water under pressure to a power generator; and
   d. passing the electrical current through the contaminated water in the flash vessel to cause a phase change of the contaminated water into evaporated water.

4. A method of distilling contaminated water, the method comprising:
   a. filling a flash vessel with a predetermined volume of contaminated water, the flash vessel being filled from an equalization basin;
   b. pulling a vacuum in the flash vessel;
   c. passing an electrical current through the contaminated water in the flash vessel to cause a phase change of the contaminated water into evaporated water;
   d. repeating steps b and c until a desired amount of distilled water is collected and a slurry remains in the flash vessel; and
   e. delivering the slurry to the equalization basin to increase the temperature and conductivity of stored contaminated water in the equalization basin.

5. A method of distilling contaminated water, the method comprising:
   a. filling a flash vessel with a predetermined volume of contaminated water, the flash vessel comprising a flash chamber and a condensing chamber separated by one or more thermally non-conductive flanges;
   b. pulling a vacuum in the flash vessel;
   c. passing an electrical current through the contaminated water in the flash vessel to cause a phase change of the contaminated water into evaporated water; and
   d. cooling one or more surfaces of the condensing chamber to facilitate condensation of the evaporated water the cooling comprising delivering the contaminated water to a heat sink bath surrounding the condensing chamber.

6. The method of claim 5 wherein the contaminated water is delivered to the heat sink bath under pressure and on a path that is non-radial to the heat sink bath, such that the delivery creates a whirlpool effect in the heat sink bath.

7. A method of recovering distilled water from a high pressure concentrate stream, the method comprising:
   a. generating electrical power by passing at least a portion of the concentrate stream through a hydroelectric power generator;
   b. passing at least a portion of the concentrate stream through an injector connected to a flash vessel;
   c. delivering at least a portion of the concentrate stream into a heat sink bath surrounding a portion of the flash vessel;

d. delivering the concentrate stream, including the portions from the generator, injector, and heat sink bath, to an equalization basin configured to distribute contaminated water from the concentrate stream to the flash vessel;

e. filling the flash vessel with a predetermined volume of contaminated water from the equalization basin;

f. sealing the flash vessel after it has been filled;

g. pulling a vacuum in the flash vessel with the injector;

h. heating the volume of contaminated water to a depressed boiling point, the heating comprising passing an alternating current through the volume of contaminated water to an electrical load;

i. collecting a predetermined volume of distilled water from the flash vessel; and j. removing a slurry from the flash vessel.

8. The method of claim 7 wherein the generator is a microturbine.

9. The method of claim 7 wherein the flash vessel comprises:

a. a condensing chamber comprising the portion of the flash vessel surrounded by the heat sink bath;

b. a flash chamber positioned below the condensing chamber and configured to contain the volume of contaminated water;

c. an internal vent connecting the flash chamber to the condensing chamber so that evaporated water may rise from the flash chamber into the condensing chamber; and d. first and second conducting plates positioned to be at least partially submerged in the volume of contaminated water, the first conducting plate being in electrical communication with the generator and the second conducting plate being in electrical communication with the electrical load;

and wherein passing the alternating current through the volume of contaminated water to the electrical load comprises passing the alternating current from the first conducting plate through the volume of contaminated water to the second conducting plate.

10. The method of claim 9 wherein the internal vent is a standpipe extending substantially into the condensing chamber, the standpipe defining the maximum fill volume of a distilled water collection trough.

11. The method of claim 9 wherein the electrical load comprises a heating element positioned at least partially within the flash chamber, and wherein heating the volume of contaminated water further comprises powering the heating element with the alternating current.

12. The method of claim 9 wherein the flash vessel further comprises a flow port through the bottom of the flash chamber, the flow port being connected to the injector so that the vacuum is pulled through the flow port.

13. The method of claim 7 wherein the heating further comprises sealing the equalization basin with a non-permeable hood so that stored contaminated water is heated by a greenhouse effect.

14. The method of claim 7 wherein the heating further comprises passing the predetermined volume of contaminated water through a water heater powered by the generator before the flash vessel is filled.

15. A water recovery apparatus comprising:

a. an equalization ("EQ") basin for storing incoming contaminated water, the equalization basin comprising:

i. a non-permeable hood that creates a substantially airtight seal over the contaminated water;

ii. an EQ air valve attached to the hood to allow rising and falling of the level of contaminated water when the EQ air valve is open; and iii. an equalization basin collecting trough positioned below the hood to collect distilled water that condenses on the hood;

b. a hydroelectric power generator configured to receive a first stream of contaminated water under pressure, generate power from the contaminated water, and deliver the first stream of contaminated water to the equalization basin;

c. a Venturi-type differential pressure injector comprising a vacuum port and configured to receive a second stream of contaminated water under pressure, generate a suction force at the vacuum port, and output a discharge stream of contaminated water;

d. a slurry pump configured to deliver slurry to the equalization basin;

e. one or more flash vessels configured to receive a predetermined volume of contaminated water from the equalization basin, the flash vessels comprising:

i. a condensing chamber comprising a distilled water collection trough;

ii. a flash chamber positioned below the condensing chamber and configured to contain the volume of contaminated water;

iii. at least one chamber flange separating the condensing chamber and the flash chamber;

iv. a standpipe extending through each chamber flange and connecting the flash chamber to the condensing chamber so that evaporated water may rise from the flash chamber into the condensing chamber;

v. an air valve attached to the condensing chamber to allow filling and emptying of the flash vessel;

vi. a heating element positioned within the flash chamber to be submerged in the volume of contaminated water;

vii. first and second conducting plates positioned within the flash chamber to be at least partially submerged in the volume of contaminated water, the first conducting plate being in electrical communication with the generator and the second conducting plate being in electrical communication with the heating element; and viii. a flow port through the bottom of the flash chamber, the flow port being connected to each of:

1. the equalization basin, to allow filling of the flash chamber;
2. the vacuum port of the pressure differential injector, to allow a vacuum to be pulled in the flash vessel without evacuating evaporated water; and
3. the slurry pump, to allow removal of the slurry;

f. a fill valve positioned in the connection between the flow port and the equalization basin;

g. a vacuum valve positioned in the connection between the flow port and the vacuum port of the pressure differential injector;

h. a slurry valve positioned in the connection between the flow port and the slurry pump;

i. a distilled water drain valve positioned to allow collection of distilled water from the distilled water collection trough;

j. a heat sink bath surrounding the condensing chamber and configured to receive a third stream of contaminated water and deliver a bath overflow to the equalization basin; and k. a programmable logic controller powered by the generator and configured to control the processes of filling the flash vessel, pulling a vacuum, heating the contaminated water, collecting the distilled water from the flash vessel, and removing slurry from the flash vessel, by opening or closing each of the fill vale, vacuum valve, slurry valve, air valve, and distilled water drain valve, according to each process.

16. The apparatus of claim 15 further comprising:

a. a fill pump positioned in the connection between the flow port and the equalization basin and configured to pump the volume of contaminated water into the flash vessel;

b. a water heater connected to the fill pump and configured to heat the volume of contaminated water; and c. a cooling device configured to receive the third stream of contaminated water and deliver it to the heat sink bath.

* * * * *